No. 677,454. Patented July 2, 1901.
K. VON KANDÓ.
APPARATUS FOR CUTTING INTO AND OUT OF CIRCUIT LIQUID RHEOSTATS OPERATED BY MEANS OF COMPRESSED AIR.
(Application filed Dec. 31, 1900.)
(No Model.)
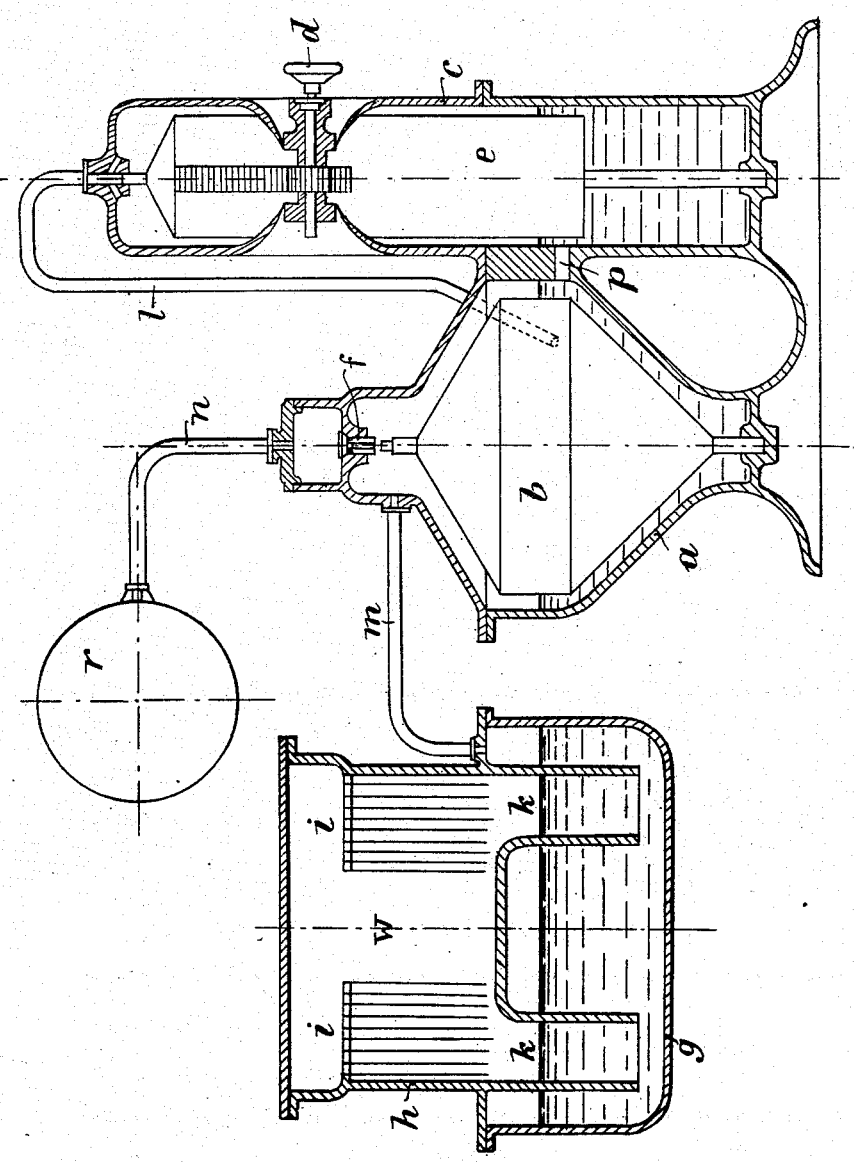

UNITED STATES PATENT OFFICE.

KOLOMAN VON KANDÓ, OF BUDAPEST, AUSTRIA-HUNGARY.

APPARATUS FOR CUTTING INTO AND OUT OF CIRCUIT LIQUID RHEOSTATS OPERATED BY MEANS OF COMPRESSED AIR.

SPECIFICATION forming part of Letters Patent No. 677,454, dated July 2, 1901.

Application filed December 31, 1900. Serial No. 41,654. (No model.)

*To all whom it may concern:*

Be it known that I, KOLOMAN VON KANDÓ, a subject of the Emperor of Austria-Hungary, residing at Budapest, in the Kingdom of Hungary, Empire of Austria-Hungary, have invented new and useful Improvements in Apparatus for Cutting Into and Out of Circuit Liquid Rheostats Operated by Means of Compressed Air, of which the following is a specification.

This invention relates to apparatus for cutting into and out of circuit liquid rheostats operated by means of compressed air and consisting of a closed vessel out of which liquid is forced by means of compressed air into a chamber containing the contact-plates.

The improved apparatus consists, essentially, of a float arranged in the closed vessel containing liquid, the said vessel communicating with a second open vessel, in which the liquid can be brought to the desired level by means of a rising-and-sinking forcing device. The closed vessel is connected with the pressure-chamber of the rheostat by means of a pipe, so that in the vessel containing the float the pressure is always equal to that in the pressure-chamber of the rheostat, so that with liquids of equal specific weights the difference between the levels of the liquid in the rheostat is always equal to that between the levels of the liquid in the vessel containing the float and the open vessel. As soon as the liquid in the vessel containing the float rises above a certain level the float opens the valve, admitting the compressed air, and the rheostat is thus put into circuit. The putting out of circuit is effected by the liquid in the vessel containing the float being caused to fall, and thus to uncover an opening through which the compressed air can escape from the rheostat and the vessel containing the float.

The annexed drawing represents one form of this apparatus in connection with the compressed-air container and a liquid rheostat, the view being a vertical section.

The apparatus consists of two vessels $a$ and $c$, communicating with each other by means of an opening $p$. The vessel $a$ contains a float $b$ and is provided at the top with an automatically-closing valve $f$, which regulates the entrance of compressed air from the vessel $r$ through the pipe $n$. The vessel $c$ contains a piston or forcing device $e$, which can be raised or lowered by means of toothed gear operated by the hand-wheel $d$. A pipe $l$, entering the vessel $a$ at a certain height, connects the said vessel with the top of the vessel $c$, which communicates with the atmosphere. Below the valve $f$ the vessel $a$ is connected by means of a pipe $m$ with the pressure-chamber $g$ of the rheostat, from which the liquid can be forced through pipes $k$ into the upper chamber $h$, containing the contact-plates $i$.

If the piston $e$ is lowered from the position in the drawing, the liquid in the vessels $c$ and $a$ rises simultaneously, the float $b$ opens the valve $f$, and compressed air enters the vessel $a$, the pipe $m$, and chamber $g$ of the rheostat. At the same time the liquid in the latter is forced up into the upper chamber $h$ and the rheostat is accordingly brought into circuit. The compressed air now forcing the liquid from the vessel $a$ into the vessel $c$, the float $b$ is caused to descend, the valve $f$ closes, and the entrance of compressed air is interrupted.

To put the rheostat out of circuit, the piston $e$ is raised, which causes the water-level in the vessels $a$ and $c$ to fall. As soon as the liquid in the vessel $a$ sinks below the level of the orifice of the pipe $l$ the compressed air from the chamber $g$ of the rheostat, the pipe $m$, and the vessel $a$ passes through the pipe $l$ to the upper part of the vessel $c$ and thence to the atmosphere, and the rheostat is accordingly put out of circuit.

It is obvious that an apparatus of this kind can be employed for putting into or out of circuit several rheostats simultaneously.

Having thus described my invention, what I claim as new, and desire to secure by Letters Patent, is—

1. Apparatus for cutting into and out of circuit liquid rheostats operated by means of compressed air, comprising two intercommunicating vessels partially filled with liquid, a piston contained in one of said vessels, means for actuating said piston, a float contained in the other said vessel, an automatically-closing compressed-air-inlet valve at the top of said float vessel, opened by the float on rising, means for supplying compressed air through said valve, means for allowing the compressed air to escape from said float vessel when required, and means for connecting the top of said float vessel with the liquid rheostat, all substantially as and for the purposes hereinbefore set forth.

2. Apparatus for cutting into and out of circuit liquid rheostats, comprising two intercommunicating vessels partially filled with liquid, a piston contained in one of said vessels, means for actuating said piston, a float contained in the other said vessel, an automatically-closing compressed-air-inlet valve at the top of said float vessel opened by the float on rising means for supplying compressed air through said valve, and a compressed-air outlet located above the normal level of the liquid in said vessel, in combination with a liquid rheostat consisting of a pressure-chamber containing a liquid, and a chamber containing plates, and conduits connecting said chambers, and means for connecting said pressure-chamber with the top of said float vessel, all substantially as and for the purposes hereinbefore set forth.

In witness whereof I have hereunto set my hand in presence of two witnesses.

KOLOMAN VON KANDÓ.

Witnesses:
 EUGENE HARRSINJI,
 FRANK DYER CHESTER.